Figure 1:
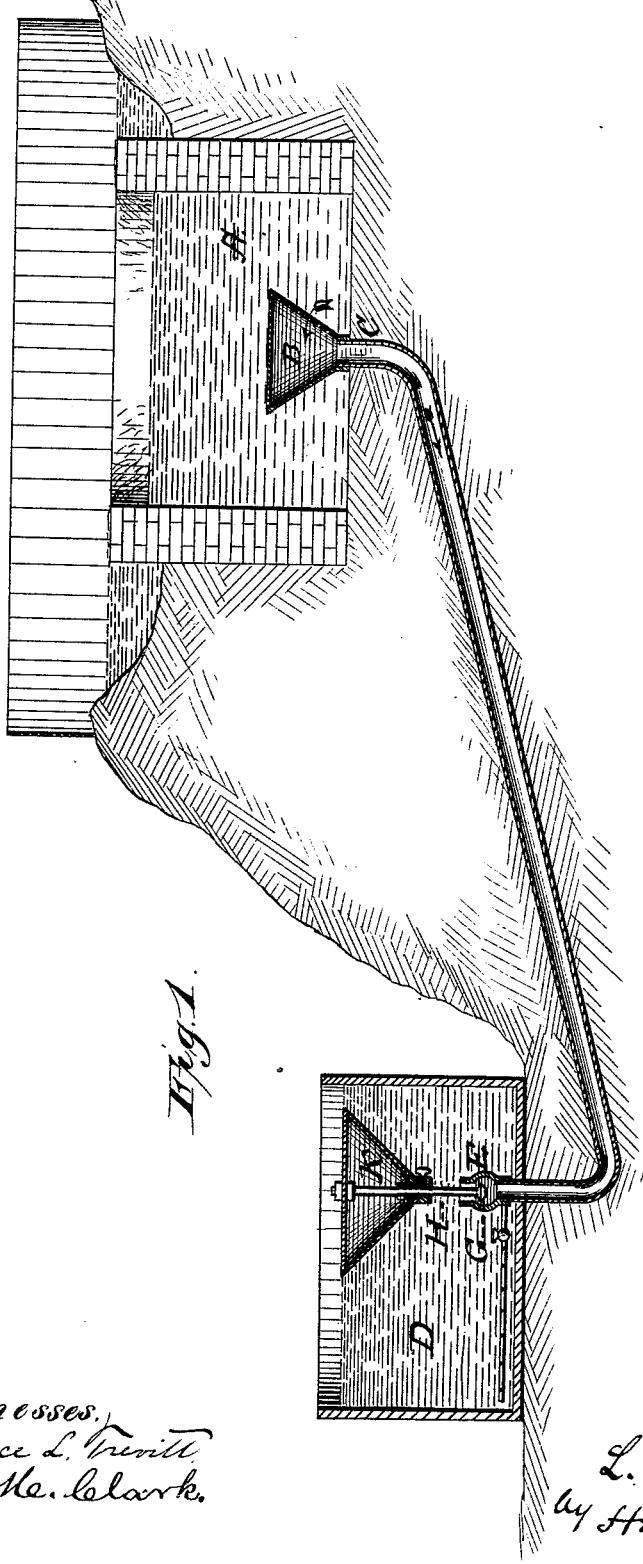

(No Model.) 2 Sheets—Sheet 1.

L. T. SLYE.
Means for Watering Stock.

No. 234,209. Patented Nov. 9, 1880.

Witnesses.
Clarence L. Trevitt
Jas. M. Clark.

Inventor:
L. T. Slye,
by Heylmun & Kane
Attorneys.

(No Model.) 2 Sheets—Sheet 2.
L. T. SLYE.
Means for Watering Stock.
No. 234,209. Patented Nov. 9, 1880.
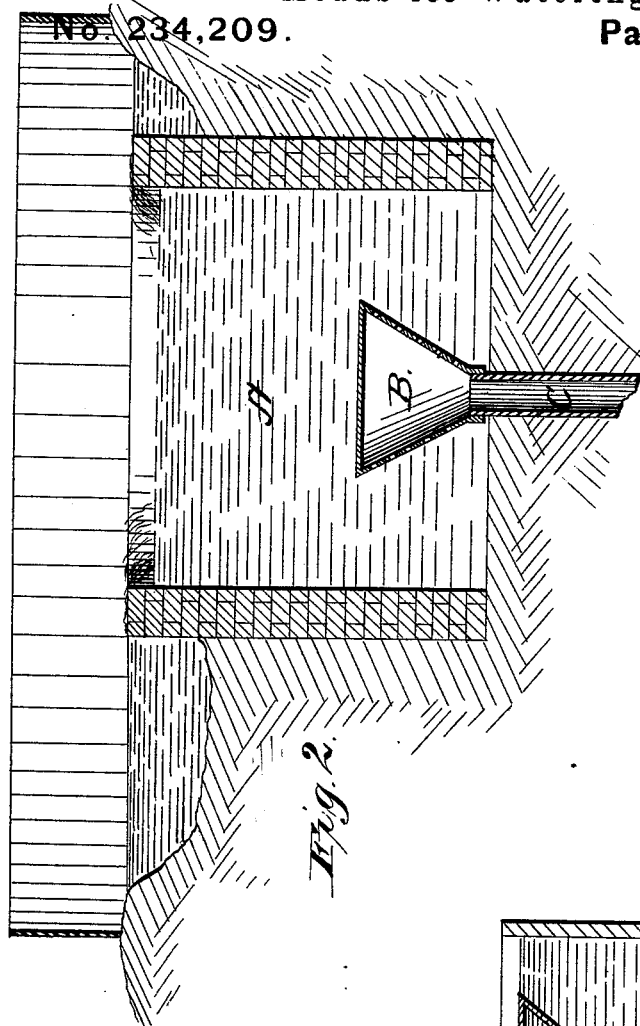
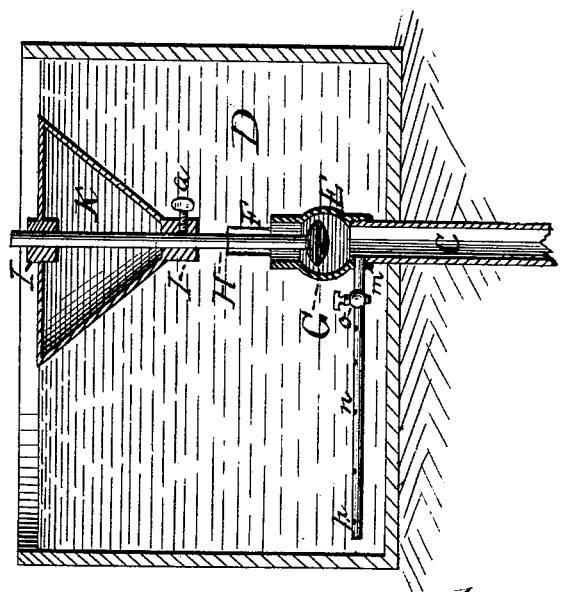
Witnesses.
Clarence L. Trevitt
Jas. H. Clark
Inventor.
L. T. Slye
by Heylmun & Kane
Attorneys.
N. PETERS, PHOTO-LITHOGRAPHER, WASHINGTON, D. C.

UNITED STATES PATENT OFFICE.

LINNAOUS T. SLYE, OF UPPER SANDUSKY, OHIO.

MEANS FOR WATERING STOCK.

SPECIFICATION forming part of Letters Patent No. 234,209, dated November 9, 1880.

Application filed July 13, 1880. (No model.)

*To all whom it may concern:*

Be it known that I, LINNAOUS T. SLYE, a citizen of the United States, residing at Upper Sandusky, in the county of Wyandot and State of Ohio, have invented certain new and useful Improvements in Means for Watering Stock; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to means for conducting water from pools to troughs or other vessels, and maintaining the supply therein without waste.

My invention consists in the combination, with a water-trough and its supply-pipe with a valve-globe, of a vertical rod having at its lower end a valve and at its upper end a float.

My invention further consists, in combination with a water-trough and its supply-pipe with a valve-globe, of a vertical rod having at its lower end a valve and at its upper end an adjustable inverted float.

My invention further consists, in combination with a water trough or vessel and its supply-pipe, of a horizontal or transverse perforated pipe provided with a valve located at the bottom of the vessel, as will be hereinafter described.

Referring to the drawings, Figure 1 is a longitudinal sectional view of the pool, sink or well, trough, and float, all connected. Fig. 2 is a vertical sectional view of the pool and sink, showing the strainer in position. Fig. 3 is a transverse sectional view of the trough or vessel and the pipes.

The objects of my invention are, first, to prevent wallowing of swine or tramping of cattle in the pool, or other animal disturbance or impurity of the water; second, to afford a continual supply of clean and fresh water in a separate trough or vessel.

To attain these objects I first secure a pool against intrusion by surrounding it with a substantial fence, then forming a sink or well in the pool, and walling the same with masonry-work, as shown in the drawings at A. The strainer B is then adjusted in convenient location—preferably in the center—in the sink, on the end of the conducting-pipe C, which leads to the place where the trough or vessel is to be located.

In the vessel or trough D, as shown at E, near the bottom, is a valve-globe secured to the end of the pipe, and having the upwardly-extending sleeve F, for inserting, and in which operates, the valve-rod.

G is the valve, with an upwardly-extending rod, H, running through the sleeve F, and extending through the bosses or collars I of the float.

K represents an inverted pyramidal float, having central bosses or collars fitting in their apertures the valve-rod, and are also provided in one or the other of them with a set-screw, as shown at *a*, for the purpose of adjusting the float at any desired height, and thus regulating the supply of water in the vessel.

It will be observed that the pressure of the water on the float will, under certain well-known conditions, close the valve and stop the supply, and that the converse must occur when this pressure is removed. At *m* in the base of the valve-globe is inserted a pipe, *n*, which extends laterally along the bottom of the vessel, and is provided with a stop-cock, *o*, and perforations *p*. The object of this pipe and its arrangements is to supply the vessel with water under exigencies of severely cold weather. By turning the stop-cock to admit the flow the water is supplied to the vessel through the perforations, and being generally below the freezing-line, the annoyances of congelation are obviated.

In the construction of the well or pool and the trough or vessel it is desirable that the bottom of the former shall be on a line with the top of the latter, in order that the supply in the vessel shall, if necessary, drain the pool; but it will be observed, also, that the excess of supply in the pool cannot overrun the capacity of the vessel, because by graduating the float on the valve-rod the valve will act as a cut-off whenever the float is carried to such height as will bring the face of the valve against the walls of the globe.

The trough or vessel used for drinking from may be constructed of any dimensions desired.

The strainer is preferably made of galvanized iron. The conducting-pipe is common inch gas-pipe. The globe-valve and float are of non-corrosive metal, usually galvanized iron.

The operation of my invention is simple and will be well understood from the foregoing description of it. The construction being accomplished, the float is adjusted to the desired height, when, by its weight, the valve is opened and the flow of water commences and continues until the float carries the valve into its seat, when the flow ceases. When the animal drinks from the vessel the water volume is reduced, and, of course, the float accommodates itself to the reduced height of surface, and to that extent the valve is opened and the supply renewed.

In winter, under conditions of very cold weather, the supply is obtained by turning the stop-cock and allowing the water to issue through the perforations in the lateral pipe.

Having described my invention, what I claim as new, and desire to secure by Letters Patent, is—

1. The combination, with a water-trough and its supply-pipe with a valve-globe, of the vertical rod H, having at its lower end a valve and at its upper end a float, substantially as described, and for the purposes set forth.

2. In combination with a water-trough and its supply-pipe with a valve-globe, the vertical rod H, having at its lower end the valve G and at its upper end an adjustable inverted float, substantially as described, and for the purposes set forth.

3. In combination with a water trough or vessel and its supply-pipe, a horizontal or transverse perforated pipe provided with a valve located at the bottom of the vessel, for the purpose hereinbefore described.

In testimony whereof I affix my signature in presence of two witnesses.

LINNAOUS T. SLYE.

Witnesses:
CURTIS BERRY, Jr.,
D. D. CLAYTON.